Oct. 13, 1953     J. L. MURRAY     2,655,354
MIXER AND PROCESSOR FOR HOME USE AND THE LIKE
Filed Aug. 29, 1947     6 Sheets-Sheet 1
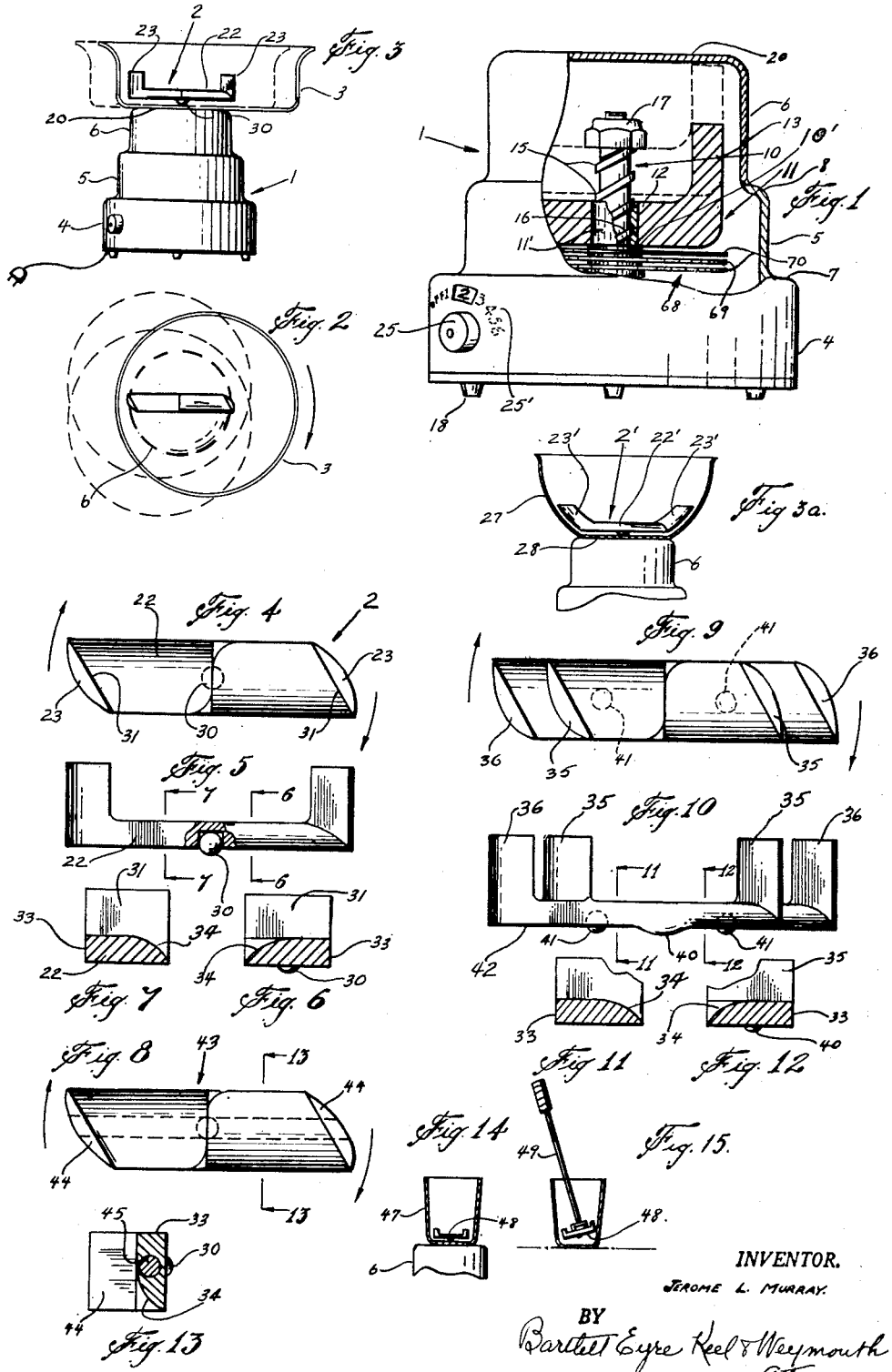
INVENTOR.
JEROME L. MURRAY.
BY
Bartlett Eyre Keel & Weymouth
Attys.

INVENTOR.
JEROME L. MURRAY.
BY
Bartlett Eyre Keel & Weymouth
Attys.

Oct. 13, 1953  J. L. MURRAY  2,655,354
MIXER AND PROCESSOR FOR HOME USE AND THE LIKE
Filed Aug. 29, 1947  6 Sheets-Sheet 3

INVENTOR.
JEROME L. MURRAY
BY
Bartlett Eyre Keel & Weymouth
Attys.

Oct. 13, 1953 J. L. MURRAY 2,655,354
MIXER AND PROCESSOR FOR HOME USE AND THE LIKE
Filed Aug. 29, 1947 6 Sheets-Sheet 4
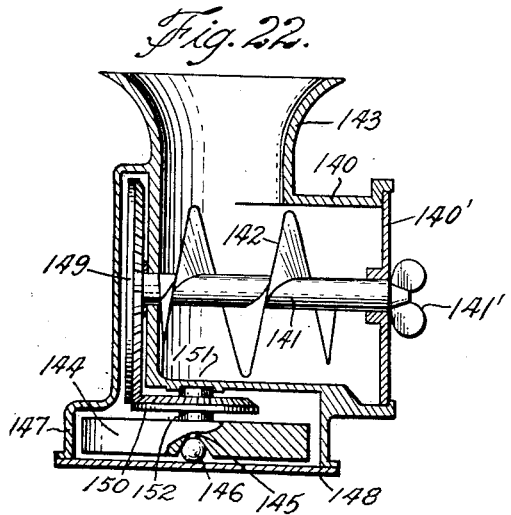
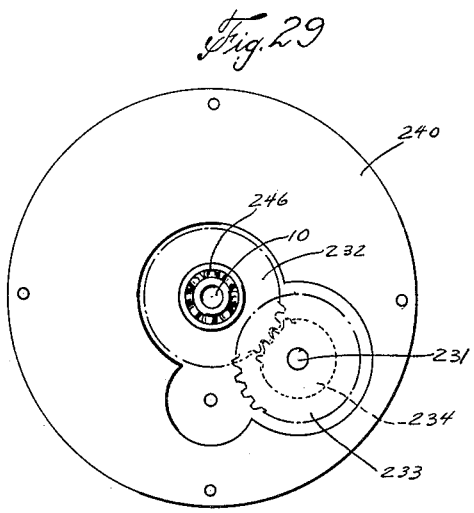
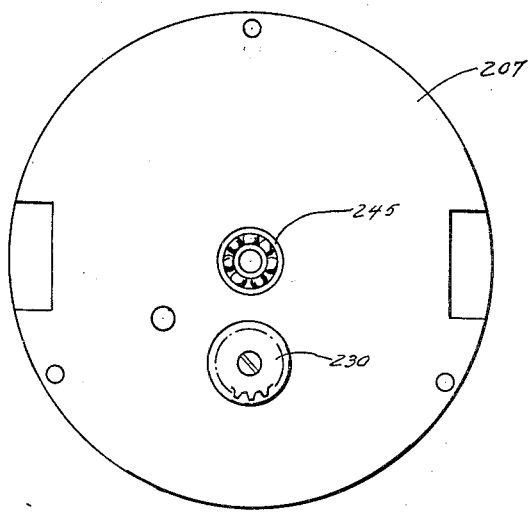
INVENTOR.
JEROME L. MURRAY.
BY
Bartlett Eyre Keel & Weymouth
attys.

Oct. 13, 1953 J. L. MURRAY 2,655,354
MIXER AND PROCESSOR FOR HOME USE AND THE LIKE
Filed Aug. 29, 1947 6 Sheets-Sheet 5
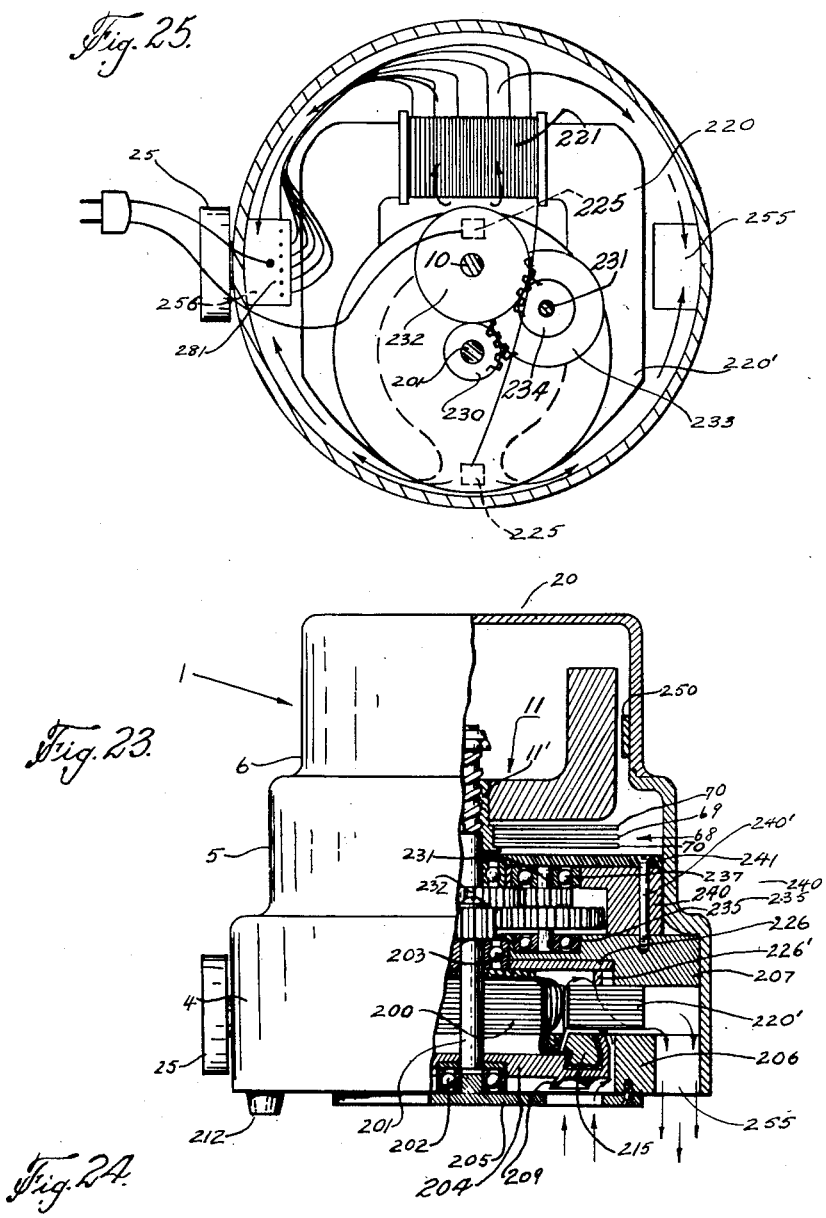
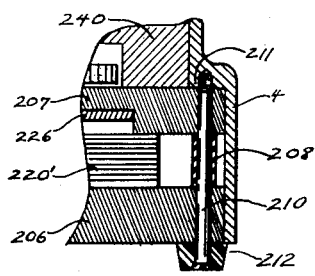
INVENTOR.
JEROME L. MURRAY.
BY Bartlett Eyre Keel & Weymouth
Attys Oct. 13, 1953         J. L. MURRAY         2,655,354
MIXER AND PROCESSOR FOR HOME USE AND THE LIKE
Filed Aug. 29, 1947                    6 Sheets-Sheet 6
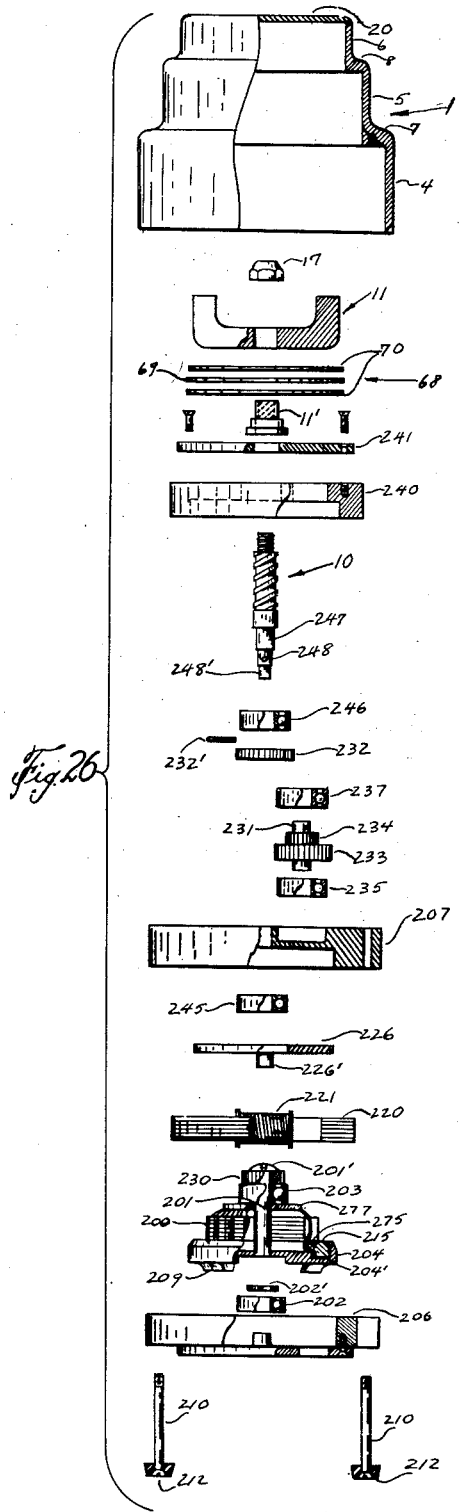
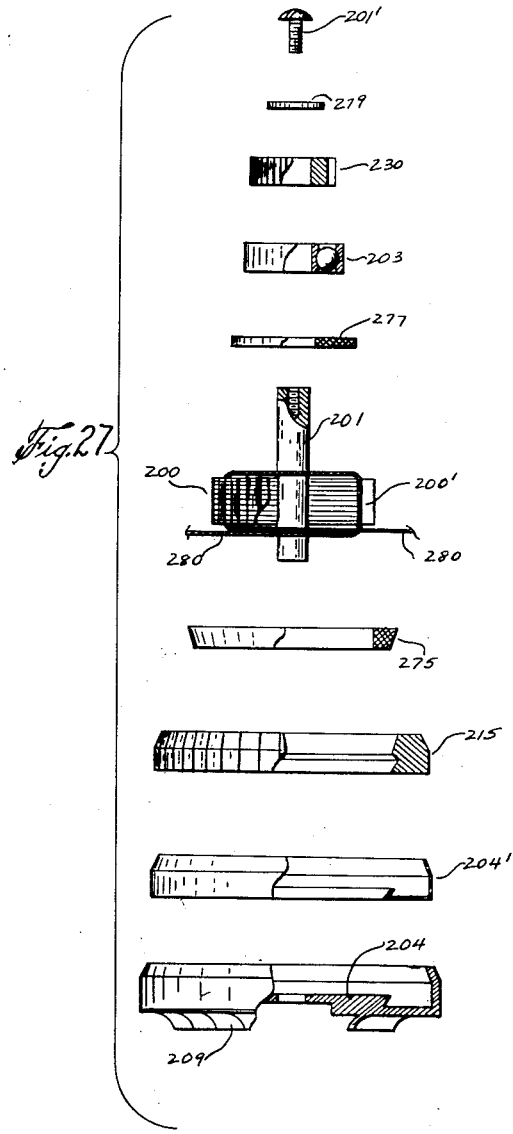
INVENTOR.
JEROME L. MURRAY
BY
Bartlett Eyre Keel & Weymouth
Attys.

Patented Oct. 13, 1953

2,655,354

UNITED STATES PATENT OFFICE 2,655,354

MIXER AND PROCESSOR FOR HOME USE AND THE LIKE

Jerome L. Murray, Stamford, Conn., assignor to Pollard & Johnston, New York, N. Y., a firm composed of Albert C. Johnston, Charles P. Pollard, D. Verner Smythe, and Donald W. Robertson Application August 29, 1947, Serial No. 771,176

26 Claims. (Cl. 259—108)

This invention relates to devices for home and kitchen use although certain features thereof have other uses.

One object of the invention is a novel and improved unit or device for the mixing, beating and preparing of food products in the home or kitchen and particularly such a unit or device which is characterized by the total enclosure of all harmful moving parts in most operations, by the compactness of the unit, by the ease of operation and manipulation of the unit or device and by the firm holding of the food product container in position against upsetting during the mixing, beating or preparing operations.

A further object of the invention is a unit or device of the above described character which is further characterized by the utilization of the magnetic transmission of power from a power unit to the mixing, beating and preparing element and more particularly by a novel construction and arrangement of driving and driven magnetic elements, whereby the required power for the heavier mixing, beating and food preparing operations is applied to the food preparing element.

A further object of the invention is a unit or device of the above indicated character comprising a food preparing element which is loosely supported upon the bottom of the food container with the latter resting upon the power or driving device and including means for reducing the strength of the magnetic field to which the food preparing element is subjected when it is initially inserted in the food container.

A further object of the invention is a unit or device of the above indicated character wherein the driving magnetic element through inertia and eddy current effects is caused to approach more closely to the preparing element upon initiation of the operation of the driving element and to recede therefrom upon the arresting of the operation of the driving element.

A further object of the invention is a novel and improved construction and relation of the magnetic driving and driven elements whereby marked efficiency is obtained in the magnetic transmission of power from the driving to the driven element and whereby marked efficiency is obtained in the food preparing operation.

A further object of the invention is a novel and improved unit or device of the above indicated character wherein the operation of the food preparing element is automatically arrested or controlled at a predetermined consistency of the food being prepared.

A further object of the invention is an arrangement to mix food products whereby the change in consistency of the food product being prepared is utilized to control or arrest the operation of the preparing element.

A further object of the invention is a novel and improved meat grinder.

Further objects of the invention are novel and improved driven means of this character which may be driven and operated by the power unit by the mere act of bringing these various means into operative relation thereto.

A further object of the invention is a universal power unit of the above indicated character having a novel and improved form of electric motor.

A further object of the invention is a novel and improved electric motor.

A further object of the invention is a unit or device of the above indicated character which is further characterized by its simplicity in manipulation and operation.

A further object of the invention is a unit or device of the above indicated character which is characterized by the economy with which it may be manufactured on a quantity production basis.

Further objects of the invention will hereinafter appear reference being made to the following description.

In the drawings:

Fig. 1 is an elevational view partly in section diagrammatically illustrating the power unit of this invention;

Fig. 2 is a plan view illustrating one mode of operation of a mixing, beating and food preparing unit or device embodying the invention;

Fig. 3 is an elevational view thereof;

Fig. 3a is a diagrammatic view of a modification of Fig. 3;

Fig. 4 is a plan view of a food preparing element;

Fig. 5 is an elevational view of Fig. 4 partly in section;

Figure 16A:
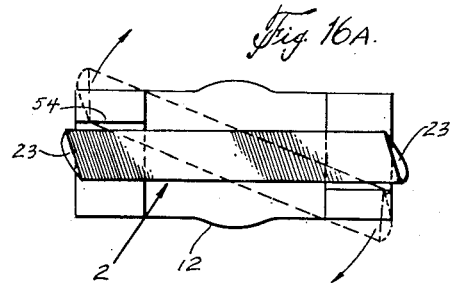
Figure 16C:
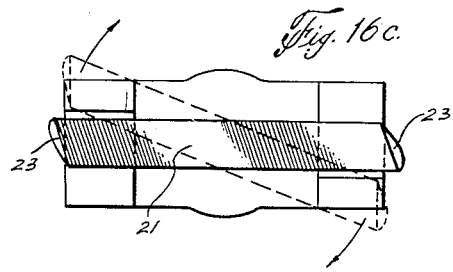
Figure 16B:
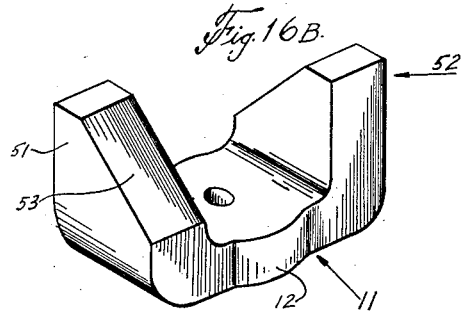
Figure 16D:
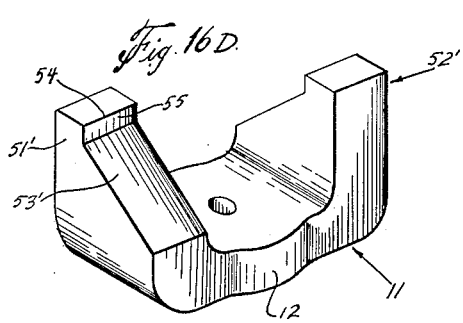
Figure 16G:
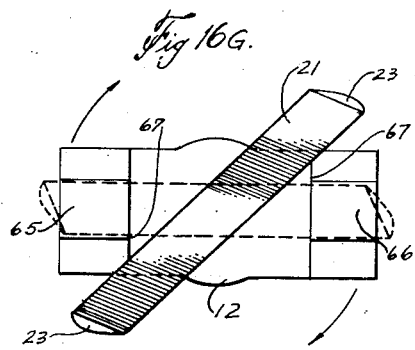
Figure 16E:
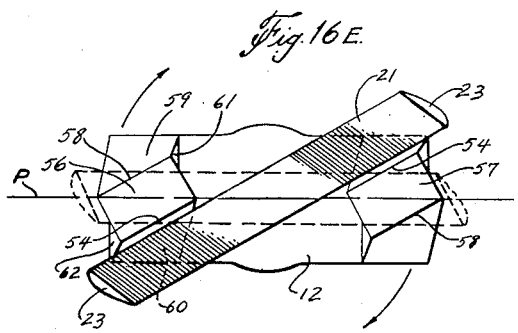
Figure 16H:
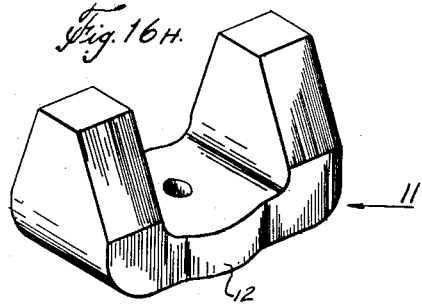
Figure 16F:
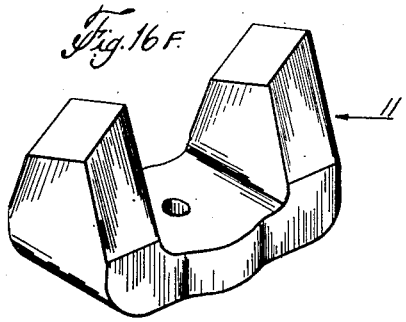
Figure 20:
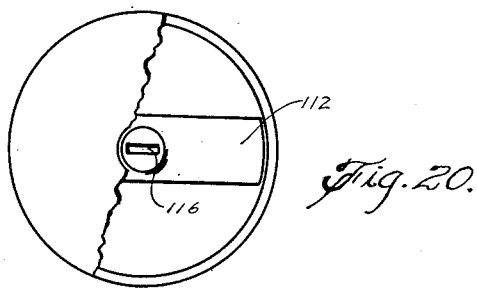
Figure 19:
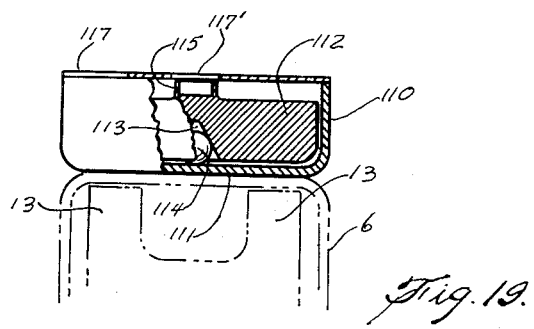
Figure 17:
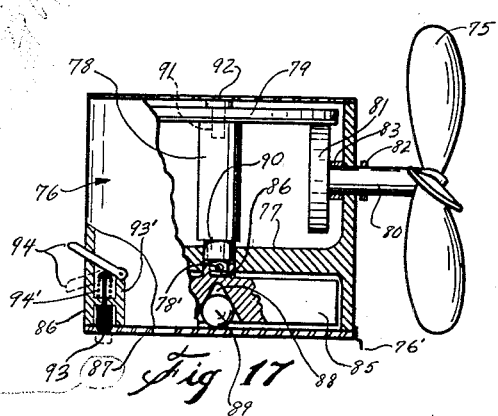
Figure 21:
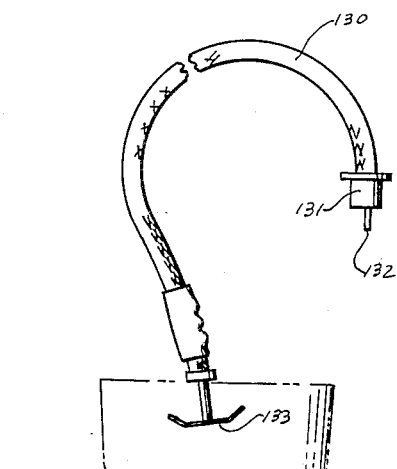
Figure 18:
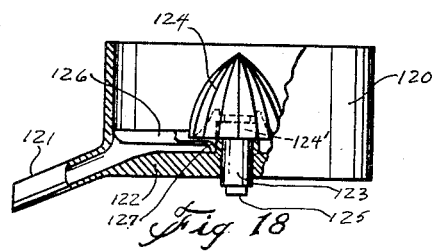

Figs. 6 and 7 are sectional views along the lines 6—6 and 7—7 respectively of Fig. 5;

Fig. 8 is a plan view of a modified form of food preparing element;

Fig. 9 is a plan view of another modified form of food preparing element;

Fig. 10 is an elevational view of Fig. 9;

Figs. 11 and 12 are sectional views with parts broken away along the lines 11—11 and 12—12 respectively of Fig. 10;

Fig. 13 is a sectional view along the line 13—13 of Fig. 8;

Fig. 14 is a fragmentary elevational view of the top portion of a power unit with the container in section;

Fig. 15 is a view similar to Fig. 4 illustrating the removal of the driven element from the food container;

Fig. 16A is a plan view of a magnetic driving element embodying the invention illustrating diagrammatically the approximate relation of the driven element thereto during the operation;

Fig. 16B is a perspective view of the driving element of Fig. 16A;

Fig. 16C is a plan view of another embodiment of the driving element;

Fig. 16D is a perspective view of the driving element of Fig. 16C;

Fig. 16E is a plan view of a preferred embodiment of the driving element;

Fig. 16F is a perspective view of the driving element of Fig. 16E;

Fig. 16G is a plan view of another embodiment of the driving element;

Fig. 16H is a perspective view of the driving element of Fig. 16G;

Fig. 17 is an elevational view partly in section of a cooling fan device embodying the invention;

Fig. 18 is an elevational view partly in section showing a juice extractor embodying the invention;

Fig. 19 is an elevational view partly in section of a power unit or drive embodying the invention for the driving of any suitable means to be driven;

Fig. 20 is a plan view of Fig. 19 with a part broken away;

Fig. 21 is an elevational view of means embodying the invention for attachment to the power device of Figs. 19 and 20 for performing a stirring or mixing operation at a point remote from the power unit;

Fig. 22 is a sectional view through a meat grinder embodying the invention;

Fig. 23 is an elevation of the power unit of the mixer showing parts in section;

Fig. 24 is an enlarged sectional view of a part of the mixer shown in Fig. 23, being taken at a different angle from that shown in Fig. 23;

Fig. 25 is a part sectional and part plan view of the power unit of the mixer with certain parts removed;

Fig. 26 is an exploded view of parts of the power unit of the mixer;

Fig. 27 is an exploded view of the parts of the electric motor;

Fig. 28 is a view of the underside of one of the plate elements forming the frame of the power unit;

Fig. 29 is a view of the underside of the upper frame plate 240.

Referring to Figs. 1 to 3 I have illustrated diagrammatically my invention as applied to the mixing, beating and preparing of food products in the home and the kitchen, such, for example, as the mixing and processing of cake batter and other food mixtures for cooking, the beating of eggs and other food products, etc. The means shown for practicing the invention comprises a power device 1 and a magnetically driven food preparing element 2, the latter being contained in a conventional bowl or dish 3 resting upon the top of the power unit 1 and containing the food product to be prepared.

The power device 1 comprises a suitable casing having, in the particular embodiment shown, three cylindrical portions or parts 4, 5 and 6 which are integrally formed as parts or portions of a single casing. The portions 4, 5 and 6 are formed of different diameters with the portion 4 having the larger diameter, the portion 5 a smaller diameter and the portion 6 of smaller diameter than the intermediate portion 5 and these portions are joined respectively to each other by the flange or shoulder portions 7 and 8. The power device 1 also comprises an electric motor (Fig. 23) housed in the bottom portion of the casing which motor is geared down to a vertical spindle or shaft 10 for driving the latter at a reduced speed. This shaft is disposed centrally of the casing, the journal mount and reduction gearing for the shaft being more particularly described below.

The spindle or shaft 10 thus being driven by the motive power carries and drives a magnetic driving element 11 comprising a bar or main body part 12 and upwardly projecting polar parts 13 integrally formed at the ends of the main body part 12. The main body part 12 of the driving magnetic element is fastened to the spindle or shaft 10 in driving relation therewith and the upwardly projecting polar parts 13 are disposed at equal distances from the axis of the spindle or drive shaft 10. This driving magnetic element 11 may be of any suitable construction; or, for example, any of the structures illustrated in Figs. 16A to 16H which are described below.

The magnetic driving element 11 is adapted to actuate the food preparing element 2 and thereby process the food product contained in the container 3, the power being transmitted magnetically through the bottom of the container 3. The magnetic driving force or field between the elements 11 and 2 may be created in any suitable manner and in the particular embodiment shown the driving element 11 is a permanent magnet. I have found it desirable for the reasons pointed out below to have the driven element 2 subjected to a comparatively small or no magnetic field at the time the element is introduced into the container 3 for initiating the processing operation and I accomplish this by mounting the driven element 11 for up and down movements to either of the positions shown respectively in full and dotted lines (Fig. 1). For this purpose the driving spindle 10 is provided at its upper portion and exteriorly thereof with a low pitch thread 15 and the body part 12 of the driving element is provided with an opening therethrough having a similar low pitch thread 16 formed in the wall of the opening therethrough for cooperation with the low pitch thread 15. In the full line position shown the driving magnetic element 13 is in the position corresponding to the stationary or de-energized position of the electric motor and rests on a shoulder 10' formed in the spindle 10 at the lower end of the thread 15. In the dash line position the driving magnetic element 11 is in operative position to drive the food preparing element 2, namely with the end surfaces of the poles 13 disposed as close to the element 2 as is practicable. In this dash line position the element 11 is held against further upward movement by a nut 17 fastened to the upper screw threaded end of the spindle 10, and the rotation of the shaft 10 is in a direction to tend to hold the element 11 in that position.

The food container 3 should be of non-magnetic or substantially non-magnetic material. It may be of glass vitreous material, non-magnetic metal, etc.

The power unit of Fig. 1 is provided with supporting buttons or feet 18 and is preferably closed at the top as indicated at 20. This top or cover 20 is of non-magnetic material, preferably metal such, for example, as 18-8 stainless steel. The casing 4, 5, 6 may be formed of any suitable material but preferably of metal and in the particular embodiment shown is integrally formed of the same material as the top 20. In the uppermost position of the driving element 11 the polar projections 13 thereof are closely adjacent the cover 20 upon which the bowl or food container 3 rests.

The food preparing element 2 is formed partly or wholly of magnetizable material depending upon the power to be transmitted and the character of the work to be done. In the particular embodiment shown it comprises a main body or bar 22 having at its ends wings or blades 23 disposed generally at right angles to the body or bar part 22. It may be of any suitable construction, such for example as shown in Figs. 4–14. It is of a length approximating that of the driving element 11 so as to minimize resistance to the magnetic flux and form a tight magnetic linkage between the elements.

In the particular embodiment shown in Figs. 2 and 3 the food preparing element 2 has a length shorter than the diameter of the bottom of the bowl 3, and the bowl 3 has a diameter of greater length than the diameter of the upper portion 6 of the casing. With the magnetic driving element 11 in the position shown in the dash lines of Fig. 1 and with the bowl 3 on the top 20 of the casing, the food preparing element 2 is driven by the driving element 11 and is maintained generally centrally disposed with respect to the axis of the shaft 10 and of the casing 4, 5, 6. The bowl 3 even in the overhanging position shown to the right in Fig. 3 is magnetically held firmly against upsetting by the magnetic attractive force between the driven element 2 and the driving element 11 so that there is no possibility of an upset. This is true not only when the driving element 11 is rotating but also when the latter is stopped. Accordingly the user need not worry about the bowl or food container 3 tipping over even if it is of larger relative diameter than that shown in Fig. 3. When the user desires to move the prepared food contained in the bowl or container 3 all she needs to do is to firmly grip the container 3 and withdraw it laterally parallel to the upper surface 20 of the casing, thereby sliding it off. There is some resistance to this movement of the container before the magnetic circuit is broken but it is easily effected.

As above described, at least the top portion of the casing is formed of non-magnetic material. This material may be of metal, plastic or any other suitable material. Preferably non-magnetic metal is used as, for example, 18–8 stainless steel. This provides a durable bearing surface for the food containers resting thereon during the food preparing operation. The remainder of the casing 4, 5, 6 may be made of any suitable material and preferably in metal. I have obtained good results by the use of Dural casting but I prefer to make the whole casing of non-magnetic metal as, for example, 18–8 stainless steel, the casing being formed according to any conventional practice.

As above described, the driving element 11 occupies two positions, the position shown in full lines in Fig. 1 when the unit is not in use and the upper position shown in short dash lines wherein the driving element 11 is in position to efficiently transmit magnetic power to the food preparing element 2. The arrangement is such that when the electric motor (not shown in Fig. 1 but shown in Fig. 23) is energized to start the motor the inertia of the magnetic element 11 causes it to move upward along the low pitch thread 15 of the spindle 10. The moment the magnetic element 11 begins to rotate with the polar projections 13 disposed adjacent the upper portion 6 of the casing, the eddy currents generated in the casing portion 6, which tend to oppose the rotation of the element, assist the effects of inertia to cause the element to traverse the low pitch thread 15 and engage the holding nut 17 whereupon the magnetic element 11 is then driven at the same speed as that of the spindle.

This arrangement has a number of advantages. The driving element 11 is, as above indicated, preferably a permanent magnet as, for example, of Alnico, a conventional metal alloy, with one of the polar projections 13 being the north pole and the other projection being the south pole. In the use of the power device diagrammatically shown in Fig. 1 for the preparation of foods in a bowl 3 resting thereupon, the preferable practice is to position the bowl 3, with the food to be mixed, beaten or otherwise prepared, on the top 20 of the power device and the food preparing device 2 is then dropped gently on to the bottom of the container or bowl, or the element is placed in the container before the latter is placed on the power device. This is done while the driving element 11 is both stationary and is in its lowermost position. This minimizes the magnetic pull upon the food preparing element 2 while it is being inserted in operative position. If the element 2 or the container with the element in it were inserted in position with the driving element 11 in its uppermost position, namely if the special arrangement for minimizing the magnetic pull were not provided, the element 2 though of comparatively light weight itself would be likely to be snapped out of the hands of the user against the bottom of the bowl or container 3 or the container with the element 2 in it would be abruptly pulled on to the power device, thereby tending to startle the user and possibly injuring the container itself, particularly if the latter is of chippable or shatterable material, such as glass. The magnetic field to which the element 2 is subjected is sufficiently weak when the driving element 11 is in its lower position to avoid these difficulties. Assuming the power device is operating to drive the preparing element 2 the operation is discontinued by simply deenergizing the electric motor as, for example, through the manipulation of a switch knob 25 disposed on the lower part 4 of the casing. When the operation is discontinued the driving element 11 remains in its upper position, so long as the container and driven element remain in position, due to the magnetic pull between the driving element 11 and the driven element 2, this attraction being greater than the downward pull due to gravity on the element 11. This, as described above, functions to hold and maintain the container 3 firmly on the top of the casing even though the container happened to be of a larger diameter than the diameter of the upper part of the casing and is eccentrically displaced as shown in Fig. 3. Upon removal of the element 2 or the removal of the bowl or container 3 this attractive pull between the element 2 and the element 11 is removed and accordingly the element 11 is rotated down the low pitch thread 15 to its lower position by the effect of gravity pull. Thus by this arrangement the driven element 2 may be easily and harmlessly inserted into and from operative position while the driving element 11 is maintained in its upper position after stoppage of the motor to hold the container firmly against upsetting.

In the embodiment illustrated in Figs. 2 and 3 wherein the bottom of the bowl or container 3 is of larger diameter than the length of the food preparing element 2 the tendency is during operation of the unit for the bowl or container 3 to assume an eccentric position and to take up two motions as indicated in Fig. 2, namely a rotating motion about its own central axis and a further body motion about the top 20 of the power device in the eccentric positions indicated by the full line and dash-dash line positions. This is also an important feature of the invention since it is clear that even though the bowl or container 3 is of larger lateral dimensions than is required for the driven element 2 the latter traverses the whole bottom surface of the bowl or container 3 thereby assuring a complete and uniform treatment or processing of the food contained in the bowl. Moreover, each of the wings 23 of the food preparing element 2 passes closely adjacent the side wall of the bowl or container 3 at each revolution of the element thereby tending to contact and treat the food layer or particles which may be adhering to the inner side wall of the bowl. The mixing, stirring, beating and food preparing operation of the element 2 naturally causes the continuous downward movement of the upper layers or parts of the food contained in the bowl or container so that every particle or portion of the food is acted on and treated by the element 2 thereby assuring a uniform and efficient preparation and treatment of the whole food body contained in the bowl or container.

In the particular embodiment illustrated in Figs. 2 and 3 the wings 23 of the element 2 are as described above generally at right angles to the main body 22 and with the particular type of bowl or container 3 shown in Fig. 3 having a substantially vertical side wall, at least for a portion of the depth of the bowl, this type of element 2 is preferable. In Fig. 3a I have illustrated a bowl or container 3 having a side wall 27 gradually increasing in diameter from the bottom 28 and while the magnetic element 2 of the general character shown in Fig. 3 operates efficiently with the specific character and type of bowl shown in Fig. 3a, it is preferred that the food treating element 2' have wings 23' which are outwardly inclined and disposed at angles to the main body part 22' greater than right angles. For example, with the wings 23' disposed substantially parallel to the side walls of that design of the side walls 27 adjacent to the element 2' a particularly efficient and satisfactory mixing, beating, stirring and food preparing operation is accomplished.

Another important feature of the invention is the provision of a central ball or rounded bearing 30 for supporting the element 2 during its actuation and rotation. In the embodiment of Figs. 3 and 5 this bearing is a ball rigidly fastened to the underside of the element 2 in any suitable manner as, for example, by providing a recess on the underside of the element of a depth slightly greater than the radius of the ball and then with the ball bearing in position in the recess the ball may be soldered in position or the metal about the recess may be pressed inwardly to engage the ball to hold it in position. For purposes of illustration the projection of the ball 30 underneath the element is slightly exaggerated. In practice I have found that the projection of the ball bearing 30 roughly 1/64 inch below the under surface of the element is adequate for minimizing friction and wear on the underside of the element, while such clearance between the under surface and the bottom of the bowl or container is insufficient to appreciably lower the efficiency of the magnetic transmission of power between the driving element 11 and the element 2. The rotation of the element 2 together with the magnetic pull between the elements 11 and 2 tends to maintain both ends of the element 2 from out of contact with the bowl or container even though the element 2 may be slightly unbalanced at its end about the ball bearing 30.

Another important feature of the invention is the provision on the element 2 of upwardly projecting wings 23 having inner edges or surfaces 31 disposed at an acute angle to the direction of movement of the rotating element, that is these inner surfaces 31 are inclined by acute angles to the tangent of the circle generated by any point along the inner sides 31. This results in the inward movement of the food being treated and prepared with respect to the ends of the element 2. Fairly good results may be obtained by forming the wings 23 so that their sides 31 are generally parallel to the direction of movement or even when reversely inclined to the direction of movement with respect to the direction indicated in Fig. 4. The inclination of the wings illustrated in Figs. 3, 4 and 5 is preferred as I have found that more efficient preparation and processing are effected by structures of this general character.

I have also found that particularly good results are obtained when the trailing edges 33 of the halves of the body portion 22 of the element 2 are not streamlined or rounded but are formed of substantially vertical straight or planar trailing edges. The leading edges 34 of the halves 22 are tapered in section as indicated in Figs. 6 and 7 to minimize the resistance to movement.

In the embodiment of Figs. 9 and 10 the food preparing element is generally of the structure of the food preparing element 2 of Figs. 2 to 7. In this modification each half of the element is provided with a pair of spaced working wings 35 and 36, these wings being spaced longitudinally of the body part of the element. In the particular embodiment shown these wings 35 and 36 are identical with the wings 23 of Figs. 4 and 5 and they are similarly arranged with respect to the body part of the element. This embodiment naturally encounters greater resistance to movement or rotation but a more efficient mixing, beating or preparing operation is effected. Each half of the main body of the element is tapered at its leading edge as shown at 34 and is provided with a plain untapered surface 33 at the trailing edge similar to the embodiment of Figs. 4 and 5.

Another feature of the embodiment shown in Figs. 9 to 12 is the provision of bearing supports on the opposite sides of the central bearing support indicated at 40 in Figs. 9 and 10. These bearing supports are indicated at 41. Preferably these project down below the under surface 42 a distance slightly less than the distance of the projection of the bearing 30 beneath the under surface 42. This arrangement prevents the under surface at the ends of the element from engaging the bottom of the food container during the food preparing operation. In this embodiment these bearing points or surfaces 40 and 41 are formed integrally with the element and on the bottom thereof during the process of manufacture.

In the embodiment of Figs. 8 and 13 the food preparing element 43 there shown is provided with a main body and wings 44 of non-magnetic material preferably metal as, for example, brass and in this embodiment the wings 44 are similarly constructed and arranged as the wings 23 of the food preparing element 2. Each half of the main body also is tapered at its leading edge as indicated at 34 and is provided with a straight planar surface 33 on the trailing edge.

This element 43 of Figs. 8 and 13 is formed as indicated mainly of non-magnetic material. However, it is provided with an opening longitudinally thereof and in this opening is disposed a magnetic bar or rod 45, this rod being of iron or other suitable magnetizable metal. The power transmitted to the element 43 by the driving element 11 is very substantially less than the power transmitted to the elements above described since the magnetic material of the element 43 is very substantially less in quantity than that embodied in these elements.

This element 43 is particularly suitable for the stirring and processing of food products which do not require the transmission of a large magnetic force for processing or where it is desired to arrest the rotation of the element 43 when a predetermined consistency of the food product is reached. For example, in the beating of egg whites, the consistency or viscosity gradually increases with the beating up to a certain point and it is particularly desirable to arrest the beating operation at a predetermined or maximum viscosity. Otherwise if the beating is continued too long the egg white has a tendency to turn back to its original viscosity and it is impossible to again beat the egg white to obtain the desired viscosity. With the food preparing or beating element 43 of Figs. 8 and 13 the user does not need to stop the driving motor when the desired consistency or viscosity of the egg white is reached because even though the motor and the driving magnet 11 should continue to rotate the element 43 is arrested in its movement by encountering a resistance to movement or rotation greater than the magnetic rotating forces transmitted and accordingly the user may simply start the motor and leave the unit untended without fear of the egg white being spoiled. This method or principle has utility also in the treatment of other food products which increase in viscosity with the treatment and where it is desired to arrest the treatment when the exact consistency or viscosity is reached. The resistance to rotation of the element 43 encountered by the wings 44 and the main body thereof needs to be adjusted with respect to the comparatively small magnetic rotating force transmitted and the predetermined consistency or viscosity of the finished product to obtain the desired results. That is, the processing element 43 contains just a sufficient mass of iron or other magnetic material to provide a magnetic rotating torque when the magnetic field furnished by the element 11 is linked therewith to rotate the element 43 in unison and synchronism with the rotation of the element 11 until a predetermined viscosity of the food product being processed is reached. This predetermined viscosity as applied to egg white beating is the viscosity just short of maximum viscosity so that upon any increase in viscosity thereabove the element 43 is either completely arrested in its rotation and stopped or its rotating speed is reduced to a value so low as not to impair the work which has been done. The magnetic power transmitting element 11 is as described above capable of furnishing a magnetic field sufficiently powerful to drive and rotate the processing elements, having sufficient volume of iron or other magnetic core material to perform the heavier food mixing and processing duties present in home and kitchen use, as indicated above. For example, with the structural elements 11 illustrated in Figs. 1 and 16A to 16H and with the different structures of processing elements described above the unit of this invention is capable of chopping ice and vegetables and if desired a special processing element having advancing edges in the form of knife cutting edges may be employed. The processing element 43 is as indicated particularly suitable for the beating of egg white where the power required is small and where it is desired that the actuation of the processing element be arrested or stopped at the predetermined consistency. In treating other products whose processing requires the transmission of heavier and larger power, the processing element would naturally need to comprise a greater percentage of iron or magnetic core material than the element 43, and in the event that the viscosity of the product at any particular stage in the processing is to control the actuation of the processing element, the latter as described above must be designed to transmit the torque desired for this purpose, taking into consideration the viscosity and consistency of the product and the resistance encountered by the shape and dimensions of the processing element.

The element 43 is only one of the many possible structures adapted to this purpose. It may be made wholly of magnetic core material instead of only being partially made of such material as shown in Fig. 8. In the embodiment of Fig. 8 the encasement of the magnetic core in the frame or bar of non-magnetic material results in a larger and heavier structure which I have found advantageous.

Another instance where it is desired to discontinue the food processing operation at a predetermined consistency or viscosity is the whipping of cream. If the whipping of the cream is continued beyond a predetermined point the cream tends to turn to butter and with the provision of a food processing element of the general character shown in Fig. 8 or by the particular design of the food processing element to correlate its maximum torque with a predetermined consistency and viscosity and resistance to rotation in the cream, the whipping operation may be automatically discontinued when or just before the critical point is reached in the whipping operation even though the driving element 11 continues to rotate.

In the embodiment of Figs. 14 and 15 I have illustrated the principle of the invention as applied to the mixing or stirring of the contents of a glass 47, the latter resting upon the upper part 6 of the power device. The stirring or agitating element 48 may be generally similar to the element 2 of Figs. 2 to 7 but it is of substantially shorter length relatively to the spacing of the polar projections 13 of the driving element 11. This is particularly adapted to the mixing of various drinks, non-alcoholic and alcoholic, in cases where it may be desired to remove the food agitating or preparing element 48 from the glass or similar container 47 for the purpose of consuming the product directly from the glass or the food product thus treated in the glass-like container may be utilized in the making or cooking of other food products. At 49 I have illustrated a manually manipulatable magnet as, for example, a permanent magnet for either inserting the food preparing element 48 into the glass or for removing the same without having to utilize the fingers. The magnetic lifter 49 can be sterilized so as to avoid contaminating the food. This lifting out principle may be applied to the food preparing elements described above.

The magnetic power transmitting element 11 may be of any suitable structure. In Fig. 16A and 16B I have illustrated a structure which cooperatively with the driven elements described above is particularly efficient in the transmission of power magnetically. In this figure the element is diagrammatically illustrated, the wings being shown at 23. In this embodiment the polar projections 51 and 52 are displaced laterally of the length of the main body part 12 of the magnet and the advancing sides of the polar projections are substantially vertically disposed or parallel to the axis of rotation of the magnet while the trailing sides indicated at 53 are inclined. In the stationary position, namely with the driving element 11 in either its lower or upper position on the spindle 10 and with the element 2 in the container the element 2 occupies the position shown in dotted lines, namely in line with and directly over the polar projections 51 and 52. As the driving element 11 rotates and transmits power to the element 2 and as the food preparing element begins to encounter resistance the latter gradually lags behind the dotted position shown in Fig. 16A, and the relative arrangement is such that the leading edge of each half of the element 2 is disposed either over the trailing portion of the end surface of its corresponding polar projection or occupies a position slightly to the rear thereof and parallel to the rear edge 54 as indicated in Fig. 16A. These positions correspond respectively to the approximate maximum load conditions, in the one position the magnetic circuit being directly from the under side of the leading portion of the element 2 to the upper surface of the trailing portion of the polar projections, or in the other position is from the leading edge of the corresponding half of the element 2 through the substantially parallel trailing edge 54 of the polar projection adjacent thereto. With this arrangement therefore the resistance of the magnetic circuit at the transfer points between the elements is reduced substantially to a minimum under load conditions.

Figs. 16C and 16D show a constructional arrangement which is generally similar to that of Figs. 16A and 16B, the main difference being that the polar projections 51' and 52' are provided with trailing inclined surfaces 53' which are inclined at a slightly greater angle than the inclination of the surfaces 53 to the vertical to form a shallow trailing surface 55 disposed parallel to the axis of rotation of the element 11 and extend down from the trailing edge 54 of the projection to the upper end of the inclined surface 53'. This results in a slightly greater concentration of magnetic flux in the polar projections to the depth of the surface 55 and is preferred over the embodiment of Fig. 16A and Fig. 16B in certain instances.

In the embodiment of Figs. 16E and 16F the polar projections 56 and 57 are not displaced laterally of the length of the main body 12 but are symmetrically in line with the center of the main body portion 12 passing through the axis of rotation. This relationship to the central longitudinal plane may be observed by the indication of plane p, as shown in Figure 16E. However, the trailing edges 54 and the leading edges 58 of the end surface of the polar projections 56 and 57 are disposed at an angle to the length of the main body part 12. The leading and trailing surfaces 59 and 60 of the polar projections 56 and 57 respectively are curved or twisted to merge into the leading and trailing edges 58 and 54 of the polar projections. The inner and outer surfaces 61 and 62 of the polar projections respectively are similarly formed to merge into the inner and outer edges of the polar projections 56 and 57. With this construction and arrangement the food preparing element 2 occupies a position over the polar projections 56 and 57 and in line with the axis of rotation with the elements stationary. The full line position of the element 2 indicates an approximate maximum load position and this position corresponds generally to that shown in full lines in Fig. 16A.

In Figs. 16G and 16H the polar projections 65 and 66 are in line with the axis of rotation of the power transmitting magnet 11 and both these projections gradually increase in width down to the main body portion 12 and are not twisted or distorted as in the embodiment of Fig. 16E. The dotted line position of the element 2 corresponds to the no load or stationary position of the parts. In the full line position the element 2 is indicated as lagging a substantial distance behind the polar projections 65 and 66 indicating the encountering of heavy resistance to rotation of the element 2 and a heavy load. While this arrangement may be satisfactory for certain purposes it is not as satisfactory as the arrangements shown in Figs. 16A to 16F. This is due to the concentration of the magnetic flux at the heavy loads in the trailing inside corners 67 of the polar projections, with consequent considerable magnetic resistance in the circuit and reduced driving torque.

I have found that with the apparatus above described the housewife is able to mix, beat and process almost all food products which need to be thus treated. With the particular structures of driving magnetic elements shown in Figs. 16A to 16H I have obtained the required driving torque, the driving elements 11 weighing from three to five pounds with a main body length of 3½ to 4½ inches and polar projection heights of from 2 to 3 inches. In the particular embodiments of Figs. 16A to 16G the polar projections are tapered in cross section to provide end polar projection surfaces of the desired area to most efficiently function with the driven elements. In Figs. 16E to 16H the end surfaces of the projections may be around a square inch whereas in Figs. 16A to 16D the area of projections as illustrated is slightly less in area. I have used driven elements 2 of various sizes and dimensions with good results. It is preferable that they overlap the ends of the polar projections of the driving magnetic element and I have obtained good results in the embodiments of Figs. 1 to 3 by employing magnetic elements 2 of around one inch width with thicknesses tapering from ¼ inch to $\frac{1}{16}$ inch. This is capable of processing the heavier food products and mixtures in kitchen use. I have found that ice may be chopped up into finer pieces by simply dumping the partially crushed ice into the food container 3 or 3'. I have also found that vegetables and the like food products may be chopped and cut to the fineness desired by utilizing a driven element of a suitable character. For example, the driven elements illustrated in Figs. 4 to 7 and 9 to 12 may be used for these purposes, the tapered leading edges 34 and the wings having edges which are sufficiently sharp to operate with fair efficiency in the ice chopping and vegetable cutting operations. If desired the tapered edges 34 and the upwardly projecting wings may be provided with sharper cutting and chopping edges approaching the cutting edges of knives, which increases the efficiency of the ice chopping and vegetable chopping operations.

The electric motor may be provided with any suitable speed regulator and I have indicated a scale at 25' indicating the multi-speed arrangement obtainable which enables the housewife to obtain any speed desired up to the maximum within the speed range. In the particular embodiment shown there are illustrated six different speeds and ordinarily this gives a sufficiently wide speed variation for practical purposes although a greater speed range may be provided if desired.

I have found that a series electric motor is particularly suitable for use as the motive element since the desired torques and speeds may be thereby readily obtained although other types of electric motors and other types of motive power may be utilized. The motor will be more particularly described below. When a series motor is used excessive speeds upon small loads or no loads are prevented by the drag upon the driving element created by the eddy currents induced in the casing, the polar projections rotating in close proximity to the top of the casing and in fairly close proximity to the sides of the casing.

The mixing, beating, stirring and food processing unit of this invention has the advantages indicated or implicit above. One advantage is there is no rotating part of the power device exposed. The food processing element itself is not even exposed in the sense of extending above the food container. Moreover, for most purposes it is of a construction such as to be completely harmless, that is when the unit is running at full speed it is possible to arrest the rotation of the stirrer by inserting one's hand into the bowl and engaging the element and without injury. Even if the user should insert a spoon or fork inside the bowl or other food container nothing serious can happen since the driving element will continue to rotate without harm to the person or serious damage to the unit or the spoon. Another advantage is that the user may completely cover the bowl or food container during the mixing, beating, stirring or food preparing operation. This avoids the possibility of spattering or throwing of the food out of the bowl, dish or other food container, and also protects the contents against contamination. The bowl or food container is, as above described, firmly held in position as long as it is on the power device and does not need to be manually held at any time. The food preparing elements are simple to wash and sterilize. The unit is compact as compared with conventional food mixers. Also the user has perfect control of the processing operation at all times to obtain the exact degree of processing desired.

At 68 in Figs. 1 and 23 I have illustrated diagrammatically a means for shielding the permanent magnet 11 from the demagnetizing forces of the A. C. field of the electric motor when alternating current is used for driving the motor. This comprises a shield formed of alternating discs of copper 69 and aluminum 70 mounted on the bearing 11' carried in the central opening of the magnet 11. These discs are spaced in any suitable manner as for example by the washers shown and are rigidly fastened to the bushing 11' as, for example, by being press fitted or otherwise. This structure forms an air gap between the upper aluminum disc 70 and the magnet 11 and between the lower disc 70 and upper plate frame member 240. There are similar air gaps between the aluminum discs and the intermediate copper disc. This shielding means minimizes the demagnetizing effects of alternating current, when used but power is transmitted with unusually good efficiency regardless of the character of current used even though the shielding means is not employed.

The power device 1 somewhat schematically illustrated in Fig. 1 is adapted for other home and kitchen uses than the food mixing, beating, stirring and preparing operations.

For example, in Fig. 17 I have illustrated the invention as applied to the driving of a cooling fan 75. This fan 75 is mounted in a cylindrical casing 76. This casing is provided with a partition 77 at a point substantially one-third the distance from the bottom of the casing 76. Centrally of the casing there is journaled in this partition 77 a drive shaft 78, this drive shaft 78 being suitably geared to the fan 75 to drive the latter at the desired efficient speed. In the particular embodiment shown, this gearing comprises a friction disc 79 carried on the upper end of the shaft or spindle 78 while the shaft 80 of the fan carries a smaller disc 81 which engages the under surface of the disc 79 at a point adjacent the periphery thereof. The fan shaft 80 is diagrammatically shown as journaled in an opening provided in the casing 76 and the shaft is retained in the desired position by a collar 82 carried by the shaft exteriorly of the casing 76 and by another collar 83 disposed interiorly of the casing 76. A magnetic member 85 which may conveniently be in the form of a straight iron bar has an upwardly projecting shaft coupling part 86 which extends into the central opening formed through the center of the partition 77 and is there suitably connected with the spindle 78 to transmit power to the fan 75. The connection diagrammatically indicated in the drawing is a pin connection passing through a spline 78' formed on the lower end of the spindle 78 and passing into a slot in the shaft coupling part 86. The casing 76 is provided with a non-magnetic bottom 87 which is preferably of stainless steel. The magnetically driven member 85 is provided on its under surface with a conical recess 88 for the accommodation of a ball bearing 89, the latter resting on the bottom closure plate 87. The discs 79 and 81 are of any suitable material, preferably rubber, and the shaft 78 is provided with longitudinal play between the lower end thereof and the partition 77, a shoulder 90 being normally, namely when the unit is not in use, above the upper surface of the partition 77. The shaft 78 is provided with a journal recess 91 at its upper end for the reception of a bearing and centering element 92.

The complete unit for operating the fan 75 includes the power device 1 shown diagrammatically in Fig. 1. The fan device of Fig. 17 is positioned on the top 20 of the power device and upon the energization of the electric motor the driving magnetic element 11 automatically moves in response to the starting of the electric motor to its upper position. In this upper position the driven element 85 of the fan device is rotated at the desired speed by the driving element 11 and when the driving element 11 is in its upper position the magnetic power transmitted is sufficient to cause the horizontal disc 79 to bear upon the disc 81 to form a firm driving engagement therewith for the fan 75. In the operating position the driven element 85 rests upon the ball bearing 89 which in turn rests upon the non-magnetic bottom 87 of the fan device. The fan blades of the fan 75 may be of rubber or other harmless material available.

The fan device of Fig. 17 may be made quite compact so as to be stored in any convenient place in the kitchen or house. It is a simple matter to merely place this device upon the power device of Fig. 1 and the latter together with the fan can be moved to any desired position for operation of the fan. During operation not only does the fan 75 rotate to furnish the desired cooling stream of air but also it constantly changes its direction by the gradual rotation of the casing 76 about the top of the power device, this gradual rotation being produced by the drag of the transmission contained therein. Thus a convenient fan unit is provided for the housewife at all times which may be positioned and operated with entire safety.

In the particular embodiment shown I have illustrated a braking means for arresting the rotation of the casing 76 and thereby fixing the direction of the blast of the fan. This means is diagrammatically illustrated and comprises a braking member 93 of suitable material such for example as rubber carried in a recess in the casing 76 and movable to a position to firmly engage the upper surface 20 of the power device. This braking means 93 is mounted in a recess in the casing 76 and is engageable by a manually operated button or lever 94 to either lift it to a position out of engagement with the power device or to a position where it engages the pwer device spring.

At 76' I have illustrated diagrammatically a finger projecting from the fan device at the bottom thereof and in the vertical plane of the spindle or shaft 80. The purpose of this finger 76' is to oppose the reaction on the fan 75 due to the blast of air being projected outwardly, thereby avoiding the tendency of the fan device to move over to a position slightly eccentric to the power device, although the magnetic pull on the driven element 85 itself tends to keep the fan centrally positioned.

A juicer unit, such as described in Patent No. 2,610,663 issued September 16, 1952, and covered per se therein, which is a division of this application, can be employed in conjunction with the power unit. Also, a knife grinding unit covered per se in divisional Patent No. 2,616,231 issued November 4, 1952, can be used.

In Figs. 19 and 20 I have illustrated an adapter driving device for use with the power device 1 of Fig. 1. This adapter device comprises a cylindrical casing 110 having a bottom 111, and in the particular embodiment shown the bottom is shown integrally formed with the side walls 110. This casing 110 is of sufficient depth to house a magnetically driven element 112, this element 112 being in the form of a bar and having a conical recess 113 on the under surface thereof for the reception of a ball-bearing 114, the magnetic bar 112 resting on the ball-bearing 114 and the latter resting on the bottom 111 of the shallow casing 110. The bar is provided with a central socket 115 having a slot 116 in the upper part thereof for the reception of a spline of a device to be driven. The casing 110 is covered by a cover 117 of any suitable material as, for example, metal, plastic, and the like. The casing 110 and the bottom 111 are formed of non-magnetic material, preferably stainless steel, and by positioning the adapter device shown in Figs. 19 and 20 on the power device the driven element 112 is brought into magnetic power transmitting relation with the power device. This adapter may be utilized for driving any suitable home appliance or kitchen device to be driven. The cover 117 is provided with a central opening 117' to accommodate the insertion of a drive means for attachment to the socket 115 of the driven element 112.

One such device to be driven by the power device and the adapter device of Fig. 19 is the fruit juicer shown in Figure 18. This juicer comprises a cylindrical casing 120 having a drain spout 121 leading downwardly from the bottom 122 thereof to a position to empty the juice to be extracted from the fruit. A central bearing element 123 is mounted in a central opening formed in the bottom 122 and this is provided with a journaled opening for the reception of a driving stem 124' of a reamer 124. This spindle or stem is provided with a spline 125 for entering the slot 116 of the socket 115. A grate 126 is disposed on the bottom 122 in a manner to catch the pulp from the fruit being juiced, this grate having a central opening whose wall 127 is downwardly peened or spun to rest upon the bottom 122 and to space the grate a short distance from the bottom.

It is a simple matter to place the juice device of Fig. 18 upon the adapter device shown in Fig. 19 with the spline 125 of the reamer driving spindle disposed in the slot 116 of the socket 115, whereupon by energizing the electric motor or power device the reamer 124 is driven at the desired speed for juicing the fruit.

In Fig. 21 I have shown a flexible drive shaft 130 having a coupler 131 on one end, which coupler carries a spline 132. This coupler 131 and spline 132 may be readily coupled to the adapter device of Figs. 19 and 20, or the reamer of the juicer device, said divisional Patent No. 2,610,663 may be removed and the coupler end of the flexible drive shaft 130 attached to the magnetically driven element thereof. This flexible shaft 130 may be used for driving any device to be driven around the home such, for example, as a stirrer, beater, or the like 133 which is attached to the other end of the shaft 130. In dash lines I have illustrated a kitchen utensil or the like containing a food product to be stirred or beaten.

In Fig. 22 I have illustrated my invention as applied to the grinding of meat and the like. This comprises a meat grinder casing 140 having suitably journaled therein a shaft 141 carrying a spiral cutting knife 142. The usual discharge plate 140' is removably held on the end of shaft 141 by a wing nut 141'. A conventional funnel or inlet 143 is indicated for the reception of the product to be ground. The grinder also comprises a magnetically driven member 144 in the form of a bar of magnetizable material having a conical recess 145 in which is disposed a ball bearing 146. The driven member 144 is housed in a shallow cylindrical casing 147 which may be if desired formed integrally with the casing 140. The casing 147 is closed at the bottom by a disc 148 of non-magnetic material as, for example, stainless steel. The meat grinder shaft 141 is geared down from the driven member 144 by means of a large bevel gear 149 mounted on the end of the shaft 141 which meshes with a smaller bevel gear 150 mounted on the upper end of a stub shaft or spindle 151 suitably journaled in the frame or casing and coupled to the driven member 144 in any suitable manner as, for example, by a spline on the lower end of the shaft 151 entering a corresponding slot in an upwardly extending central projection 152 on the driven member 144. It is a simple matter for the housewife to place the grinding device illustrated in Fig. 22 upon the top of the power device shown in Fig. 1 and then energize the electric motor for driving the driving element 11, the latter in turn driving the driven element 144 of the grinding device to perform the grinding operation.

In this embodiment of the invention the driven device 144, 147 is made a part of the grinding device as a unit but if desired this driven device may be omitted and the adapter driven device of Figs. 19 and 20 used in place of it. In this case the grinder would be positioned on the adapter driven device of Fig. 19 and the driven device 112 thereof would be coupled to the grinder by having the spline of the shaft 151 enter the slot 116 of the adapter device.

Also, cleaning, polishing and scouring of kitchen utensils and other articles can be accomplished as taught in divisional application Serial No. 122,811 filed September 16, 1949.

In Figs. 23, 24 and 25 I have illustrated certain features of the power unit 1 which are not disclosed in Fig. 1. The electric motor is housed within the lower part 4 of the casing. It comprises an armature 200 mounted for rotation on a vertical shaft 201, the latter being journaled at its lower end in a ball bearing 202 and at a point near its upper end by a ball bearing 203. The bearing unit 202 is partly housed on the under side of a plate disc 204 forming a part of the armature unit, and rests upon a bottom plate 205 which is fastened in any suitable manner to a lower plate 206 of a pair of plates forming the support for the motor. The upper plate is indicated at 207. The bearing unit 203 is housed within an opening formed on the underside of the upper plate 207. The plates 206 and 207 are maintained in spaced relation by the spacer members 208 and are held firmly together in the operative supporting position by means of a multiple number of elongated fastening bolts 210, the latter passing up through registering openings formed in the plates 206, 207 and screw threadedly attached to washers 211 formed on the interior of the intermediate portion 5 of the casing. The bolts 210 also at the same time fasten supporting feet 212 tightly against the plate 206 and in the particular embodiment shown there are three of these fastening bolts 210 and feet 212.

The commutator ring is carried within an annular recess formed near an outer edge or periphery of the armature supporting plate 204 and one of the segments of the commutator is shown in section at 215. The armature field comprises the U-shaped bar 220 having a field coil 221, with the poles 220' closely surrounding the armature. In the particular embodiment shown the motor has two brushes 225 insulatedly carried by a disc 226 which is mounted in a recess formed on the underside of the plate 207, this disc 226 having a central opening for engaging the ball bearing unit 203.

The drive from the motor shaft 201 to the driving element spindle or shaft 10 comprises a gear 230 on the upper end of the motor shaft 201, an idler gear unit mounted on a pin or stub shaft 231 and a gear 232 mounted on the shaft 10. The idler unit comprises a comparatively large gear 233 meshing with the pinion 230 and a smaller gear 234 meshing with the larger gear 232. The stub shaft 231 carrying the idler gears is journaled at its lower end in a bearing unit 235 carried in a recess formed in the upper surface of the plate 207 and at its upper end in the ball bearing unit 237 journaled in an opening formed in an upper frame plate 240, the latter resting upon and being suitably fastened to the plate 207. A comparatively thin plate 241 is fastened to the upper side of the heavier frame plate 240 as, for example, by means of the screws indicated. The bearing unit 237 is thus confined in its recess by the plate 241. The frame plate 240 is provided with a recess in its underside for housing the gears 233 and 234 together with their shaft 231. The driving gear 232 is splined to the shaft 10 near its lower end and the latter is supported at its lower end by a ball bearing unit 245 which rests on the plate 226. A bearing unit 246 forms the upper bearing of the spindle 10 and the part 247 of the shaft 10 forms a tight or press fit with the inner part of the bearing 246. This bearing 246 is housed in a recess formed in the upper part of the plate member 240 and is housed at its upper side in a recess formed on the underside of the plate 241. The inner part of the bearing 245 forms a tight or press fit with the portion 248' of the spindle 10. The intermediate part 248 of the spindle carries the gear 232. The gear 232 is fastened to the shaft by a pin 232'. At 240' are indicated bolts for fastening the plate frame 240 to the plate frame 207.

At 250 I have illustrated the copper ring or collar carried by the inside of the upper part 6 of the casing for controlling and regulating the eddy currents induced by the rotation of the permanent magnet 11, this copper ring or collar being of sufficient dimensions, taking into account is proximity to rotating magnetic poles to obtain the desired control of the upward movement of the permanent magnet 11 from its lower position to its upper position and also the control to limit or prevent excessive speeds when a series motor is used.

The plate 205 is provided with openings for the intake of air and the armature frame 204 is provided with wind vanes 209 for the suction of air about the whole periphery of the commutator ring and forcing it about the armature and the field coil and outwardly through the openings 255 and 256 formed in the lower plate frame 206.

I claim:

1. In a food processor for home use, a casing having a non-magnetic top and adapted to support a non-magnetic container for food thereon, a magnetically driven food processing element freely positioned on the bottom of the food container, a rotatable shaft in said casing, means driving said shaft, a magnetic driving element mounted on said shaft and adapted to occupy a lower position wherein the magnetic field to which the food processing element is subjected is of low strength and an upper position in which the strength of the field to which the food processing element is subjected is substantially greater, said shaft and said driving element being coupled together by means of a low pitch thread for moving the magnetic driving element from its lower position to its upper position when the shaft begins to rotate and permitting the movement of the magnetic element by gravity to its lower position when the rotation of the shaft is stopped and the magnetic circuit formed through the driving element and the food preparing element is broken.

2. In a food processor for home use, a casing having a non-magnetic top and adapted to support a non-magnetic container for food thereon, a magnetically driven food processing element movably positioned on the bottom of the food container, a rotatable shaft in said casing, means driving said shaft a magnetic driving element mounted on said shaft and adapted to occupy a lower position wherein the magnetic field to which the food processing element is subjected is of low strength and an upper position in which the strength of the field to which the food processing element is subjected is of substantially greater strength, said shaft and said driving element being coupled together by means of a low pitch thread for moving the magnetic driving element from its lower position to its upper position when the shaft begins to rotate and permitting the movement of the magnetic element by gravity to its lower position when the rotation of the shaft is stopped and the magnetic circuit formed through the driving element and the food processing element is broken, and means causing the rotating driving element to generate eddy currents for putting an additional drag upon the driving element at starting.

3. In a device of the character set forth, a frame having a non-magnetic top, a magnetically driven means for performing work and including a non-magnetic casing mounted on said non-magnetic top, a shaft rotatably mounted in said frame, means driving said shaft, and a magnetic power transmitting element carried by said shaft and screw threadedly mounted thereon for limited movement longitudinally thereof, the mass of the element and the pitch of the thread being correlated to cause the element to travel by gravity from its uppermost to its lower position when not subjected to lifting forces.

4. In a device of the character set forth, a frame having a non-magnetic top and adapted to support a non-magnetic container on the top thereof, a non-magnetic container, a magnetic power transmitting element rotatably mounted in said frame and adapted to assume a multiple number of positions at varying distances from the top of the frame, motor means connected with said magnetic element, screw threaded means between said motor element and magnetic element moving said magnetic element to a driving position near said top when being rotated and away from said top when stationary and a magnetically driven element freely positioned on the bottom of said container and having a centrally disposed bearing portion on its under surface, said element having operating wings on its upper side.

5. In a food processor for home use, the combination including a power device and a non-magnetic container for food placeable on the top thereof, a rotatable magnetic power transmitting element disposed adjacent the bottom of the container, and a movably positioned driven bar element in the container containing magnetic material and whose halves are tapered at the leading edges and blunt at the trailing edges.

6. In a food processor for home use, the combination including a power device and a non-magnetic container for food placeable on the top thereof, and comprising a rotatable magnetic power transmitting element disposed adjacent the bottom of the container, and a driven bar element in said container containing magnetic material and whose halves are tapered at their leading edges and blunt at the trailing edges, said bar having wings disposed at acute angles to the tangents of the circle of rotation.

7. In a food processor for home use, the combination including a power device adapted to support a non-magnetic container for food placeable on the top thereof, a rotatable magnetic power transmitting element disposed adjacent the bottom of the container, and a driven bar element in said container containing magnetic material and whose halves are tapered at their leading edges and blunt at the trailing edges, said bar having wings disposed at acute angles to the tangents of the circle of rotation, and said bar having a substantially centrally disposed bearing surface on the underside thereof.

8. In a device of the character set forth, a frame adapted to support thereon a container containing a product to be processed, a magnetically driven processing element in said container, and a magnetic driving element mounted for rotation in said frame and comprising a main bar or body part with polar projections, said polar projections being formed to have the advancing and trailing edges thereof disposed substantially parallel to each other and in planes at an acute angle to a longitudinal plane through the axis of rotation.

9. In a device of the character set forth, a frame adapted to support thereon a container containing a product to be processed, a magnetically driven processing element in said container, and a driving element mounted for rotation in said frame and comprising a bar having polar projections which are offset at their ends from a central longitudinal plane through the axis of rotation, said polar projections having trailing surfaces which are inclined to a central longitudinal plane through the axis of rotation.

10. In a device of the character set forth, a frame adapted to support thereon a container containing a product to be processed, a magnetically driven processing element in said container, and a driving element mounted for rotation in said frame and comprising a bar having polar projections which are offset at their ends from a central longitudinal plane through the axis of rotation, said polar projections having trailing surfaces which are inclined to a central longitudinal plane through the axis of rotation with the inclined surfaces extending from the trailing edges of the end surfaces of the polar projections.

11. In a device of the character set forth, a frame adapted to support thereon a container containing a product to be processed, a magnetically driven processing element in said container, and a driving element mounted for rotation in said frame and comprising a bar having polar projections which are offset at their ends from a central longitudinal plane through the axis of rotation, said polar projections having trailing surfaces which are inclined to a central longitudinal plane through the axis of rotation with the inclined surfaces merging into trailing surfaces of the projections which are parallel to the longitudinal central plane through the axis of rotation.

12. A magnetically driven food processing element comprising a bar driveable only through magnetic force, said bar containing magnetic material and having wings projecting upwardly therefrom, said wings being disposed at angles to the tangent of the circle of rotation and having inner planar surfaces and outer curved surfaces merging at the trailing and leading edges with the planar surfaces.

13. A magnetic driving element for food processors comprising a bar having polar projections on the ends thereof with the polar projections being centrally and symmetrically disposed with respect to a central longitudinal plane passing through the axis of rotation and with the trailing end edges of the polar projections being disposed parallel to each other and at acute angles to the central longitudinal plane.

14. A magnetic driving element for food processors comprising a main bar having polar projections whose end surfaces are offset laterally from and on the opposite sides of a central longitudinal plane passing through the axis of rotation, the trailing portions of the projections being formed of planar surfaces beginning at the trailing edges of the end surfaces of the projections.

15. In a power device of the character set forth, a casing, an electric driving motor, a shaft mounted for rotation in said casing and driven by the motor, a magnetic driving element mounted on said spindle or shaft, and screw thread connections between said driving element and shaft, so as to move the magnetic element to a lower position when the shaft is stationary and the magnetic circuit to a magnetic member outside and directly above the casing is broken and to an upper operating position when the shaft is rotated by said motor.

16. In a power device of the character set forth, a casing, a spindle or shaft mounted for rotation in said casing and a magnetic driving element mounted on said spindle or shaft and including threaded means carrying the magnetic element so that the driving element occupies a lower position when the shaft is stationary and the magnetic circuit to a magnetic member outside and directly above the casing is broken and an upper operating position wherein the magnetic driving element is closely disposed to the top of the casing, said top being of non-magnetic material.

17. A portable power unit of the character set forth, comprising a casing which is circular in cross-section and has a top formed of non-magnetic material for the support of a device thereon carrying a magnetic driven member, a frame member spaced from the top of said casing, a driving shaft or spindle journaled in said frame member and extending upwardly to a point adjacent the top of the casing, said shaft carrying a magnetic driving member, an electric motor unit disposed below said frame member and fastened to the casing, said motor unit comprising upper and lower plate frame members with the upper plate frame member supporting the first said frame member and means coupling said electric motor to said shaft, said electric motor comprising an armature mounted eccentrically with respect to the casing and journaled for rotation between said upper and lower plates.

18. In a power device of the character set forth in claim 3 wherein the magnetic driven means includes a meat grinder unit with reduction gearing between the shaft of the meat grinder and the magnetically driven element for driving the meat grinder at a slow speed.

19. A power device of the type arranged to drive an externally located magnetic driven member comprising a casing, a vertical spindle mounted for rotation in said casing, a magnetic driving element mounted on said spindle, a series-wound electric motor disposed in the lower part of said casing and mechanically coupled with the spindle, magnetic shielding interposed between said motor and driving element, and means moving the magnetic element to an upper and operating position with the element closely disposed to the magnetically driven member when the motor is operating and to a lower inoperative position when the motor is stopped.

20. In a power device of the character set forth in claim 19 wherein said magnetic driving element rotates in juxtaposition to the wall of said casing.

21. In a power device according to claim 19 wherein said magnetic shield comprises a plurality of spaced alternately disposed aluminum and copper plates.

22. In a device of the character set forth, a frame having a top, a non-magnetic container on said top, a shaft rotatably mounted in said frame, a magnetic power transmitting element carried by said shaft and screw threadedly mounted thereon for limited movement longitudinally thereof, the mass of the element and the pitch of the thread being correlated to cause the element to travel by gravity from its uppermost to its lower position when not subjected to lifting forces, a magnetically driven element in said container, an electric motor mechanically coupled to the shaft and a magnetic shield between the motor and the magnetic power transmitting element.

23. In mixing apparatus having a driven magnetic mixing element within a container positioned on the surface of a driving unit; a non-magnetic container on said surface, a driving unit comprising a casing, the said surface comprising a portion of the casing, a rotatable driving magnet mounted within the casing, means to rotate the driving magnet, said rotating means when not energized permitting the driving magnet to be positioned at a substantial distance from the said surface, and means comprising screw thread means for advancing the driving magnet to a position closely adjacent the said surface when the rotating means is energized.

24. In a portable power unit of the character set forth, a casing having therein a plate frame member spaced from the top of the casing, a lower and intermediate plate frame member upon which the first member rests, a lower frame member upon which the intermediate frame rests, a vertical shaft journalled for rotation at least in part on the uppermost plate frame member, said shaft carrying a magnetic driving member, an electric motor housed between the intermediate and lower plate frame members, gearing between the electric motor and said shaft, and a screw-threaded means on said vertical shaft connecting said magnetic driving element therewith, said magnetic driving element occupying a lower and inoperative position on said shaft and an upper and operative position thereon when said motor is rotated.

25. In a power device, a casing adapted to support a driven unit thereon, a magnetically driven element freely positioned in the driven unit, a rotatable shaft in said casing, a magnetic driving element mounted on said shaft and adapted to occupy a lower position wherein the magnetic field to which the driven element is subjected is of low strength and an upper position in which the strength of the field to which the driven element is subjected is substantially greater, said shaft and said driving element being coupled together by means of a low pitch thread for moving the magnetic driving element from its lower position to its upper position when the shaft begins to rotate and permitting the movement of the magnetic element by gravity to its lower position when the rotation of the shaft is stopped and the magnetic circuit formed through the driving element and driven element is broken.

26. In a food processor for home use, a casing having a non-magnetic top and adapted to support a non-magnetic container for food, a magnetically driven rotating element in said food container, a driving magnetic element rotatably mounted in said casing and having poles, motor means connected with said magnetic element, screw-threaded means between said motor element and magnetic element moving said magnetic element to an active driving position near said top when rotated with the poles thereof closely adjacent the bottom of the container for rotating the driven element and away from said top when stationary.

JEROME L. MURRAY.

References Cited in the file of this patent

UNITED STATES PATENTS

| Number | Name | Date |
|--------|------|------|
| 457,902 | Kintner | Aug. 18, 1891 |
| 589,195 | Robinson et al. | Aug. 31, 1897 |
| 591,395 | Fay | Oct. 12, 1897 |
| 644,649 | Walter | Mar. 6, 1900 |
| 682,642 | Sachs | Sept. 17, 1901 |
| 871,672 | Campbell | Nov. 19, 1907 |
| 890,658 | Keiper | June 16, 1908 |
| 936,400 | Arnold | Oct. 12, 1909 |
| 1,104,793 | Grillet | July 28, 1914 |
| 1,319,332 | Harley | Oct. 21, 1919 |
| 1,420,774 | Stainbrook | June 27, 1922 |
| 1,487,523 | Apatow | Mar. 18, 1924 |
| 1,533,208 | Pursell | Apr. 14, 1925 |
| 1,536,203 | Frydenlund | May 5, 1925 |
| 1,708,493 | Brinkley | Apr. 9, 1929 |
| 1,827,608 | Pickard | Oct. 13, 1931 |
| 1,834,934 | Brach | Dec. 8, 1931 |
| 1,887,284 | Brady | Nov. 8, 1932 |
| 1,938,040 | Reis | Dec. 5, 1933 |
| 1,950,810 | Nichols | Mar. 13, 1934 |
| 1,960,324 | Van Deventer et al. | May 29, 1934 |
| 2,012,167 | Johnson | Aug. 20, 1935 |
| 2,120,919 | Linden et al. | June 14, 1938 |
| 2,182,469 | Davis | Dec. 5, 1939 |
| 2,211,377 | Langgasser | Aug. 13, 1940 |
| 2,241,983 | Connolly | May 13, 1941 |
| 2,350,534 | Rosinger | June 6, 1944 |
| 2,354,563 | Weisse | July 25, 1944 |
| 2,356,784 | Graham | Aug. 29, 1944 |
| 2,366,562 | Schug | Jan. 2, 1945 |
| 2,373,609 | Stahl | Apr. 10, 1945 |
| 2,404,342 | Harrison | July 17, 1946 |
| 2,416,300 | Godsey | Feb. 25, 1947 |
| 2,416,833 | Katcher | Mar. 4, 1947 |
| 2,428,784 | Cole | Oct. 14, 1947 |
| 2,469,834 | Maerz | May 10, 1949 |
| 2,549,121 | Osterheld | Apr. 17, 1951 |